United States Patent [19]
Månsson et al.

[11] Patent Number: 5,884,854
[45] Date of Patent: Mar. 23, 1999

[54] METHOD AND SYSTEM FOR MECHANICAL SEPARATION OF VARIOUS MATERIALS/SUBSTANCES FROM DISPOSED FLUORESCENT LIGHT TUBES AND SIMILAR LAMPS BEING CRUSHED

[75] Inventors: Hans-Eric Månsson, Lyckeby; Christer Sundberg, Karlskrona, both of Sweden

[73] Assignee: MRT System AB, Karlskrona, Sweden

[21] Appl. No.: 913,858

[22] PCT Filed: Mar. 19, 1996

[86] PCT No.: PCT/SE96/00345

§ 371 Date: Oct. 8, 1997

§ 102(e) Date: Oct. 8, 1997

[87] PCT Pub. No.: WO96/29157

PCT Pub. Date: Sep. 26, 1996

[30] Foreign Application Priority Data

Mar. 23, 1995 [SE] Sweden .................................. 9501057

[51] Int. Cl.[6] ............................. B02C 19/12; B02C 23/08
[52] U.S. Cl. ...................... 241/19; 241/24.14; 241/24.22; 241/79.1; 241/99; 241/DIG. 38
[58] Field of Search ..................................... 241/19, 24.13, 241/24.14, 24.22, 79.1, 99, DIG. 38

[56] References Cited

U.S. PATENT DOCUMENTS

| | | | |
|---|---|---|---|
| 5,388,773 | 2/1995 | Perry | 241/19 |
| 5,492,278 | 2/1996 | Raboin | 241/57 |
| 5,586,730 | 12/1996 | Mortrud | 241/24.22 |
| 5,683,041 | 11/1997 | Sewill et al. | 241/19 |

FOREIGN PATENT DOCUMENTS

| | | |
|---|---|---|
| 0 420 367 | 4/1991 | European Pat. Off. . |
| 0 599 088 | 6/1994 | European Pat. Off. . |
| 40 30 732 | 12/1991 | Germany . |
| WO 93/01888 | 2/1993 | WIPO . |
| WO 93/01889 | 2/1993 | WIPO . |
| WO 94/05428 | 3/1994 | WIPO . |

*Primary Examiner*—John M. Husar
*Attorney, Agent, or Firm*—Young & Thompson

[57] ABSTRACT

Method and system for mechanical separation of materials from discarded fluorescent light tubes being broken up. The system comprises a fan-driven exhaust air system which is designed for air transportation and separation of material fragments and which is supplied with air from three separating towers (8, 8', 8"). A mill (2) which breaks up the fluorescent light tubes delivers fluorescent light tube material to a first separating tower (8) where larger material fragments are separated off, while smaller material fragments and particles leave the tower together with the outflowing air. A screen (22) divides the coarse fraction from the tower into glass fragments and metal fragments. The metal fragments from the screen are made to pass through a metal crusher (28) which is connected to a second separating tower (8'). A magnetic separator (34) separates off magnetic material from a conveyor (32) for the glass fragments and metal fragments. From the conveyor (32), the glass fragments are made to pass through a glass crusher (42) which is connected to a third separating tower (8"). From the coarse fraction outlet of the third tower, the glass fragments are conveyed via a tumbler to a waste container (54). A cyclone (58) with downstream filters (66, 70) separates off fluorescent powder from the exhaust air.

11 Claims, 3 Drawing Sheets

METHOD AND SYSTEM FOR MECHANICAL SEPARATION OF VARIOUS MATERIALS/SUBSTANCES FROM DISPOSED FLUORESCENT LIGHT TUBES AND SIMILAR LAMPS BEING CRUSHED

FIELD OF THE INVENTION

The present invention concerns both a method and a system for mechanical separation of various materials/substances from discarded fluorescent light tubes and similar low-pressure discharge lamps being broken up.

BACKGROUND OF THE INVENTION

A fluorescent light tube is a type of low-pressure discharge lamp which in most cases is designed as a closed glass tube (which, for example, can be straight, circular, or bent in a U-shape) with a cathode at each end. The glass tube encloses a gas filling containing mercury vapour. When the fluorescent light tube is switched on, an electron current passes through the gas filling from one cathode to the other. Mercury atoms in this gas filling are then acted upon by the electron current in such a way that they emit invisible ultraviolet radiation. On the inner side of the glass tube there is a layer of fluorescent powder (fluorescent substance) which has the property of converting the short-wave ultraviolet radiation into long-wave visible light.

Since a fluorescent light tube therefore contains a certain (albeit small) quantity of mercury, it is extremely important, from the conventional point of view, when disposing of used fluorescent light tubes, to deal with the mercury from these tubes in an efficient and safe manner. Discarded fluorescent light tubes must therefore be treated as exceptional hazardous waste which is sent to a special destruction plant where the mercury can be dealt with and recovered in a manner which is efficient and, from the point of view of environmental protection, completely satisfactory.

In a fluorescent light tube which is to be disposed of, the mercury which has condensed from the mercury vapour is found on the inner side of the glass tube wall, and since this inner side is coated with a fluorescent powder layer, most of the condensed mercury is therefore found in the fluorescent powder.

Additional mercury, in the form of mercury oxide and/or amalgam, is also found as precipitated particles which have deposited on the inner side of the glass tube wall, especially in the vicinity of the cathodes at the ends of the fluorescent light tube.

Analysis of various parts of crushed or ground fluorescent light tubes has additionally shown that the so-called cathode screen (usually a ferrous strip bent round the cathode) can itself have a relatively high concentration of mercury, for which reason it should be the subject of special treatment for separating off mercury, for example distillation.

A number of methods are already known for dealing with the mercury-containing fluorescent powder from discarded fluorescent light tubes. In one of these known procedures, the cathodes and the end sections including the metal end-sleeves (the end sockets provided with contact pins) of the fluorescent light tube are cut loose or cut off from the rest of the tube so that the latter is open at its ends. The fluorescent powder can then be suctioned or raked out of the tube with the aid of some suitable type of plunger-like scraper tool which has a long shaft and which is pulled or pushed through the glass tube, open at its ends, from one end to the other end.

While it is true that most of the mercury-containing fluorescent powder can in this way be cleared out of the glass tube cut off at its ends, the mercury-containing fluorescent powder and the mercury oxide found in the cut-off end sections of the fluorescent light tube cannot be dealt with and recovered in this way. The cut-off end sections can of course themselves be after-treated and distilled.

When the destruction of discarded fluorescent light tubes involves the fluorescent light tubes being crushed in their entirety (for example in a screw feeder), this also has the consequence that the lead oxide glass which is used as the end seals of the glass tube and as cathode holders will be mixed with the crown glass from the remaining parts of the fluorescent light tubes. This is a considerable disadvantage since it means that the usability of the recovered glass as a raw material for the manufacture of new glass products is thereby limited. The value of the recovered glass as a recovered raw material for the manufacture of new glass products is in this way drastically reduced.

In EP-A-0420367 there is disclosed a method and device for sanitation of mercury-containing lamps. DE-A-4030732 discloses a method for recycling of fluorescent lamps/tubes and broken pieces thereof. WO-A-9301889 discloses a method for removing metal electrical tips from fractured glass derived from a fluorescent tube crusher, and a tip separator for use with crushed fluorescent light tubes.

OBJECTS OF THE INVENTION

An aim of the invention is to make available a novel method and system for mechanical separation of various materials/substances, and in particular all the mercury, from all parts of a discarded fluorescent light tube being broken up.

More specifically, an aim of the invention is to make available a mechanical treatment and separation of fluorescent light tubes in such a way that the component parts of the fluorescent light tubes are, in quite general terms, separated and divided up into three fractions, namely magnetic end-sleeve material (end socket material), fragments and mercury-containing fluorescent powder. As regards the glass which is recovered, it is particularly desirable to ensure that lead glass from the end-sleeve is not mixed with the crown glass from the remainder of the fluorescent light tubes.

SUMMARY OF THE INVENTION

The abovementioned aims are achieved, according to the invention, by virtue of the fact that the method involves the steps recited in the method claims while the corresponding system, which can be used for carrying out the method, has the structural elements specified in the systems claims.

According to the method of the invention, discarded fluorescent light tubes are fed into a mill (preferably a hammer mill) where they are broken up into fairly large pieces or material fragments. With the aid of a current of air moving at a relatively high speed (for example 20 m/s), the material fragments are then transported from the mill and in through the inlet into a first separating tower where larger material fragments, of glass and metal, are separated off from the current of air and are discharged from the tower (preferably through a coarse fraction outlet at the bottom end of the tower), while smaller material fragments and particles, such as fluorescent powder, are conveyed by the current of air onwards out through the air outlet of the tower, which air outlet functions as a fine fraction outlet.

The larger material fragments discharged from the tower are then divided up into glass fragments and metal fragments by screening/sieving, and the glass fragments are conveyed onwards past a magnetic separator, while the metal fragments are fed into a crusher, where they are crushed, and are then introduced by means of a current of air through the inlet into a second separating tower. The metal fragments discharged from the coarse fraction outlet of this second tower are then also conveyed past the magnetic separator. The magnetic material fragments separated off by means of this separator are thereafter collected in a vessel for possible further treatment, for example distillation.

The glass fragments which have passed the magnetic separator are then fed into a glass crusher where they undergo a further reduction in their size, and they are then introduced by means of a new current of air through the inlet into a third separating tower. The glass fragments discharged from the coarse fraction outlet of this tower then undergo an after-treatment and are finally collected in a waste container. The fluorescent powder which is entrained in the currents of exhaust air from the outlets of the three separating towers is first separated off from this exhaust air by means of a cyclone, and thereafter by means of dust filters. The mercury vapour which may possibly remain in the exhaust air thus filtered is finally separated off by means of charcoal filters in order to prevent mercury vapour from reaching the atmosphere.

The larger material fragments separated off from the transporting current of air in the separating towers can be discharged from the towers, for example through the coarse fraction outlets at the bottom ends of the towers, with the aid of a rotary valve which is arranged there.

The glass fragments which are separated off by the screening/sieving downstream of the first separating tower, and the metal fragments which are separated off in the second tower, can be transported past the magnetic separator on a common conveyor path, for example in the form of a belt conveyor.

The after-treatment of the glass fragments discharged from the coarse fraction outlet of the third separating tower can be carried out, for example for several minutes in a preferably ventilated, rotating drum feeder or tumbler, from which the glass is then transported onwards by means of a discharging conveyor to the waste glass container.

To carry out the above-mentioned method, a system having the structural elements specified in the system claims can preferably be used. A basic feature of the system according to the invention is that the system comprises a preferably fan-driven exhaust air system which is designed for the transport and separation of material fragments and particles and which is supplied with air from three separating towers which each have a material inlet, a coarse fraction outlet, and an air outlet which is situated at the uppermost part of the tower and which functions as a fine fraction outlet. The mill responsible for the initial breaking-up of the discarded fluorescent light tube supplied to it can preferably be a hammer mill, the material outlet of which is then connected to the material inlet of the first tower.

The use of a hammer mill for initially breaking up the fluorescent light tubes is preferable because a mill of this kind smashes or cracks the fluorescent light tubes into large pieces, which means that the metal end-sleeves with the lead oxide glass located therein remain relatively intact. Most of the lead glass thus remains in the end-sleeves and is not therefore mixed with the remainder of the glass.

The screen or the sieve which receives the discharged material from the coarse fraction outlet of the first separating tower is used to divide the material fragments thus discharged into glass fragments, on the one hand, and metal fragments, on the other hand, by means of screening/sieving. For further breaking up of these metal fragments, a special metal crusher is used whose material outlet is connected to the inlet of the second separating tower. Both the metal crusher and the glass crusher and the three separating towers can be of types which are already known per se. The cyclone coupled between the air outlets of the separating towers and the suction fan of the exhaust air system, with its downstream exhaust air filter, can also be of any suitable type which is already known. The fluorescent powder which is separated off from the air in the cyclone is expediently tapped off, via a bottom outlet in the cyclone, straight down into a container for fluorescent powder.

In one embodiment of the system which is particularly expedient from the point of view of environmental protection, the system is accommodated entirely in a closed housing, preferably in the form of a closed standard container, inside which a specific pressure is maintained which is below the surrounding atmospheric pressure in the space or at the site where the closed housing/container has been set up. The risk of mercury or of mercury vapour being able to leak out into the surrounding environment outside the housing is in this way effectively avoided.

BRIEF DESCRIPTION OF THE DRAWINGS

The invention will now be described and explained in more detail hereinbelow, with reference to the attached drawings which show, on the one hand, the basic construction of a system according to the invention and the flow of various fluorescent light tube materials through the system, and, on the other hand, an example of how the units included in the system can be placed and grouped within a container housing which accommodates the system.

In the figures in the drawings.

DESCRIPTION OF THE PREFERRED EMBODIMENTS

Figure 1:
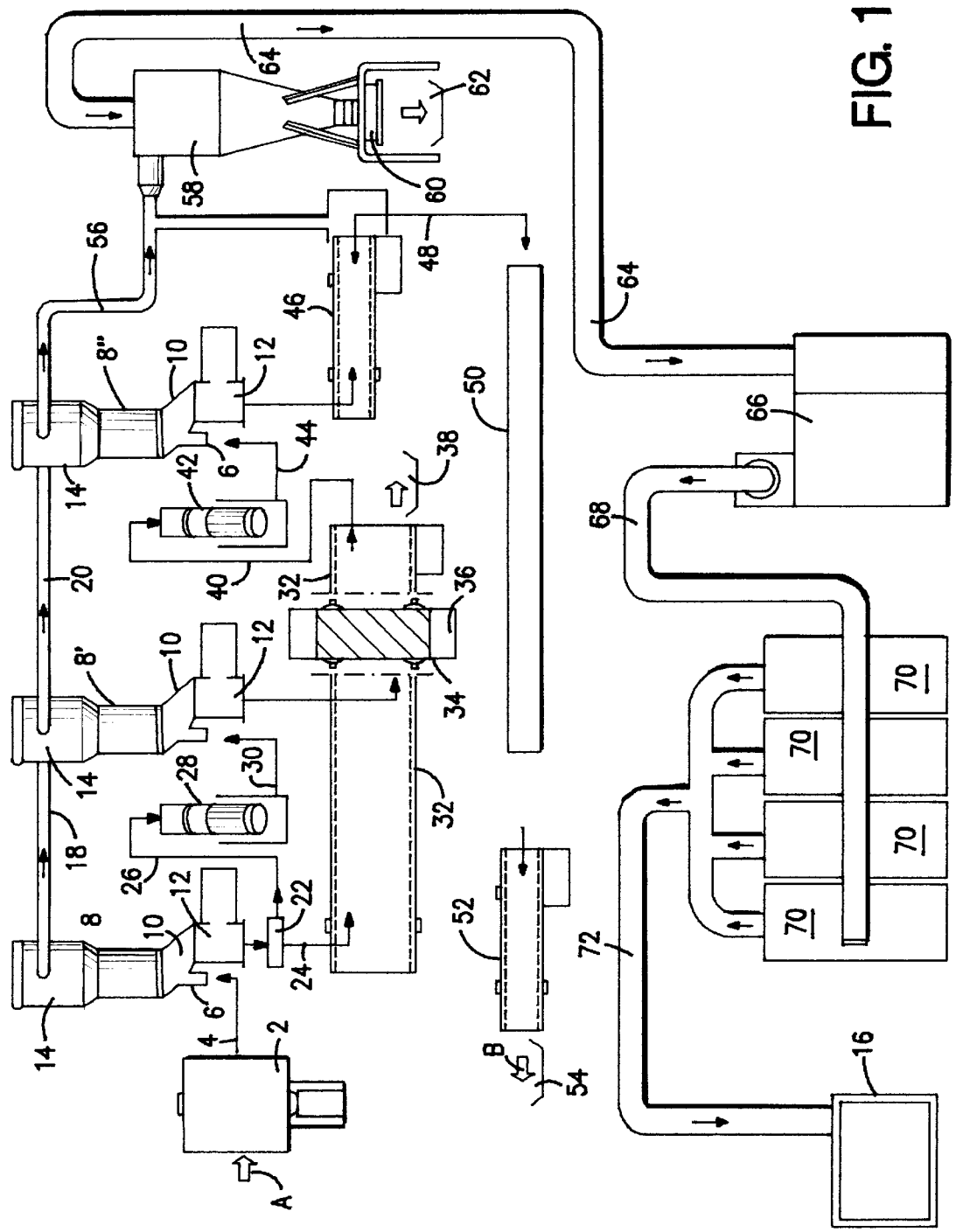
FIG. 1 shows diagrammatically a system according to the invention, and more specifically how the units included in the system are arranged to interact with each other, the "flow arrows" showing the transport paths of the fluorescent light tube material in the system, and how the air in the system's fan-driven exhaust air system flows.

Reference is now made in the first instance to the system solution diagram in FIG. 1 in which the discarded fluorescent light tubes which are to be treated in the system are fed, see arrow A, into a hammer mill 2, preferably with the aid of a feed-in conveyor (not shown here). The fluorescent light tubes which have been supplied are broken up into fragments in the mill 2, and these fragments are then suctioned out of the mill by means of a current of air 4 generated by the system's fan-driven exhaust air system, which will be explained in more detail in the description which follows. The fluorescent light tube fragments which have thus been removed by suction from the mill 2 are introduced through an inlet 6 into a first vertically arranged separating tower 8. This tower has, at the bottom, a coarse fraction outlet 10 with a rotary valve 12 for discharging larger material fragments, of glass and metal, from the tower. These larger material fragments are separated off from the current of air in the separating tower, while smaller material fragments and particles, such as fluorescent powder, are conveyed onwards by the air current and leave the tower through its air outlet 14 which is located at the top and which functions as a fine fraction outlet. As is evident from FIG. 1, the system comprises two further separating towers 8' and 8" which also form part of the system and are connected to the common exhaust air system, which is driven by a suction fan 16. The air outlet 14 of each of the separating towers 8, 8', 8" are connected to each other via air channels 18 and 20.

The larger fragments of material discharged from the tower 8 are then made to pass through a screen or a sieve 22 which divides them up into glass fragments, which are conveyed onwards in accordance with the arrow 24, and metal fragments, which are conveyed onwards in accordance with the arrow 26 to a metal crusher 28. The term "screen" will be understood hereinafter to mean both "screen" and "sieve", but for the sake of clarity only the term "screen" will be used. In the same way, the term "screening" will be understood to mean both screening and sieving. The metal fragments which have been supplied are crushed and broken up in the crusher 28 into even smaller pieces, and these are then introduced, by means of a current of air 30, through the inlet 6 into the second separating tower 8'. The metal fragments which are separated off from the current of air in this second tower are then discharged through the rotary valve 12 of the tower and are transferred to one half of a belt conveyor 32, on the other half of which the glass fragments from the screen 22 are deposited, see arrow 24. Immediately above the material-transporting upper surface of the belt conveyor 32 there is a magnetic separator 34 which is arranged crosswise over the conveyor 32. The magnetic particles from the glass and metal paths of the conveyor, which particles have been separated off by means of the magnetic separator 34 from the upper surface of the belt conveyor 32, are collected in a container (distiller barrel) 36 for possible further treatment, for example distillation. The fragments of metal, plastic, electrode and lead glass which have passed under the magnetic separator 34 without being separated off are collected in a waste container 38 at the end of the belt conveyor 32.

The glass fragments which have passed the separator 34 are then fed, see arrow 40, into a glass crusher 42 where they undergo a further reduction in their size. The glass which is now more finely divided is then conveyed onwards from the glass crusher 42 by means of an air current 44 in through the inlet 6 into the third separating tower 8". The glass which is separated off from the air current in the separating tower 8" and is discharged from the tower via the rotary valve 12 is thereafter transferred to a conveyor 46 which feeds the glass, see arrow 48, to the inlet end of a drum feeder 50 inside which the glass undergoes a final after-treatment for a few minutes. From the outlet end of the drum feeder 50, the glass is transferred to a belt conveyor 52 from which the glass is finally delivered, see arrow B, to a waste container 54.

The airborne material which has been emitted through the air channel 56 from the outlets 14 of the separating towers 8, 8' and 8", and which essentially consists of fluorescent powder, is conveyed onwards into the upper end of a cyclone 58, where most of the fluorescent powder is separated off from the current of air and discharged via a bottom outlet 60, see arrow C, to a waste container 62 for fluorescent powder. The air cleaned in the cyclone 58 then continues through the channel 64 to a dust filter 66 where the finer particles in the air are also separated off and delivered to a container (distiller barrel). From the dust filter 66, the exhaust air is conveyed onwards through the channel 68 to a battery of charcoal filters 70. In these charcoal filters, any remaining mercury vapour is finally separated off from the current of air which is led from the charcoal filters, via a channel 72, to the intake side of the fan 16. In the case of a completely closed exhaust air system, the cleaned air which has now reached the fan 16 can then be led, from the pressurized delivery side (not shown) of the fan, back to the flow path 4 downstream of the hammer mill 2.

As has been pointed out above, FIG. 1 shows the basic construction of a system according to the invention, i.e. how the units included in the system are designed to interact with each other. In practice, the system is of course designed in such a way that both the air transportation paths and the conveyor paths of the various belt conveyor are not unnecessarily long and do not take up too much space. It is therefore desirable that the whole system be designed in such a way that the units included (mill, separating towers, crushers, screen, conveyors, magnetic separator, rotary drum feeder, cyclone, filters and fan) are grouped in an optimal manner from the point of view of system construction and additionally in such a way that they are accessible for inspection and maintenance.

From the point of view of environmental protection, it is also desirable that the whole system can be accommodated in a closed housing in which it is possible to maintain a specific subatmospheric pressure which prevents mercury or mercury vapour leaking out from the system and into the surrounding atmosphere.

For the abovementioned reasons, it is expedient that the system be given a commercial design which is more compact than that shown in FIG. 1.

Figure 2:
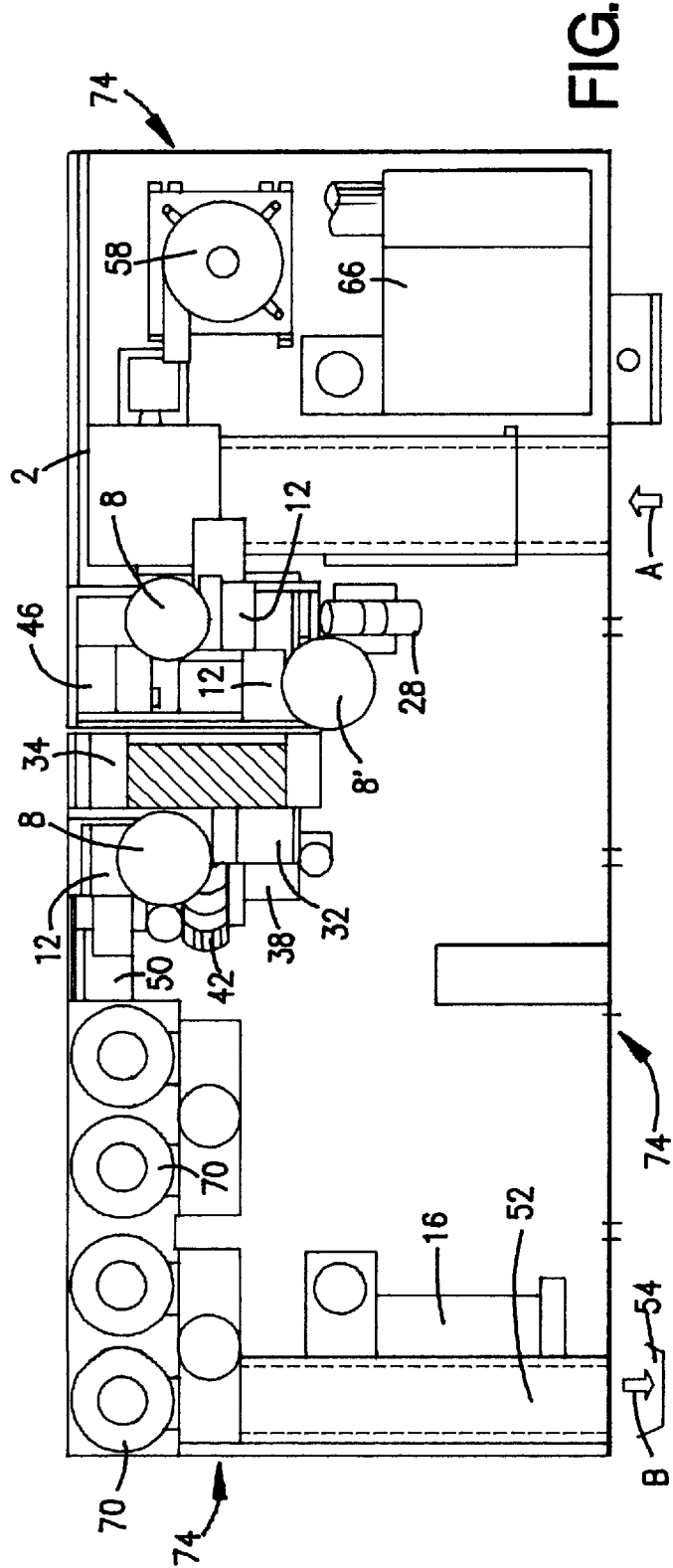
FIG. 2 shows, in a horizontal projection, the inside of a container housing which accommodates a commercial embodiment of a system according to the invention.
Figure 3:
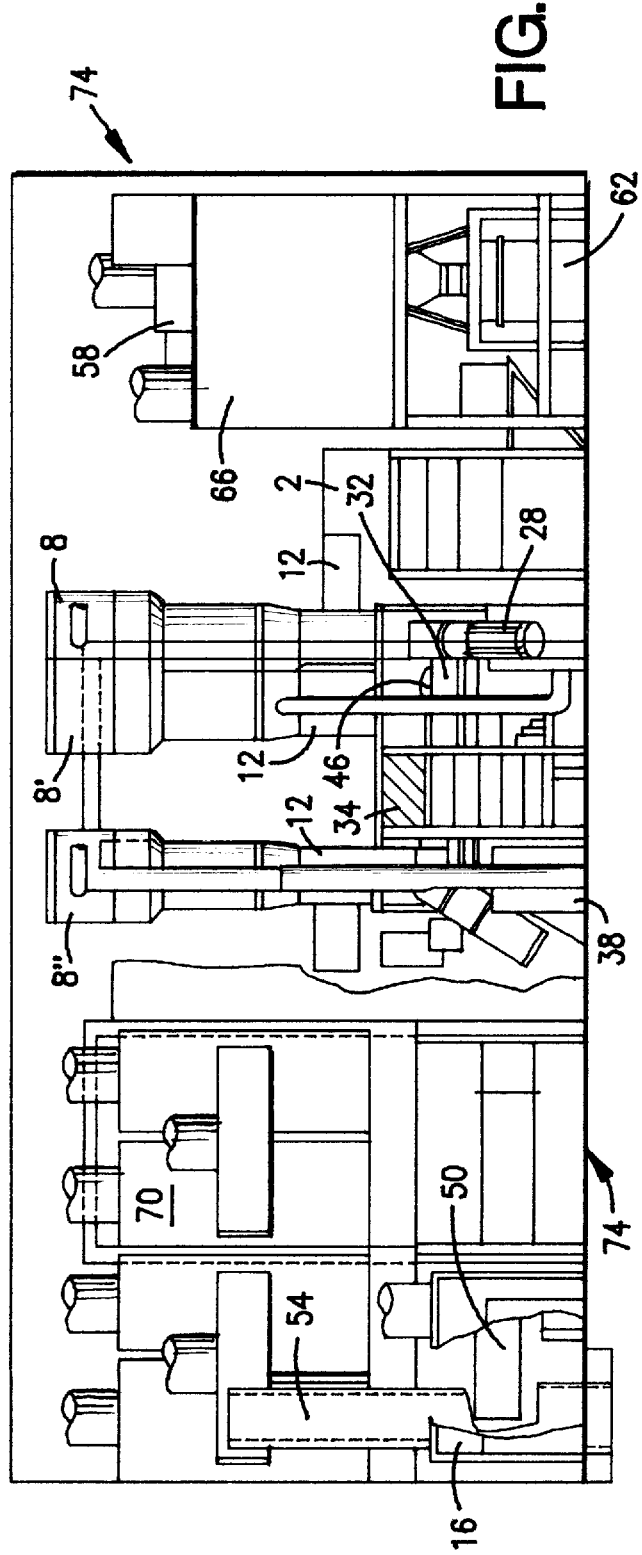
FIG. 3 shows, in a vertical projection, the system construction inside the container housing according to FIG. 2.

Such a commercial design in which the system is accommodated in a closed housing unit, for example a 20-foot standard container 74, is shown in FIGS. 2 and 3. This commercial construction of the system corresponds entirely with the basic construction which is shown in FIG. 1, the only difference being that the units included in the system have been placed in an optimal manner from the point of view of function and system construction. Since FIGS. 2 and 3 therefore concern units which are the same as those in accordance with the basic embodiment in FIG. 1, there is no need here for a renewed explanation of the construction of the system and its function, and instead reference is made quite simply to FIGS. 2 and 3 where the units have been provided with the same reference labels as in FIG. 1.

We claim:

1. Method for mechanical separation of various materials from discharged fluorescent light tubes and similar low-pressure discharge lamps being broken up, which comprises:

feeding discarded fluorescent light tubes into a mill where they are broken up into material fragments;

introducing the material fragments with a current of air into a first separating tower where larger material fragments, of glass and metal, are separated off from the current of air and are discharged from the tower, while smaller material fragments and particles, including fluorescent powder, are conveyed onwards by the current of air;

dividing the larger material fragments which have been discharged from the tower into glass fragments and metal fragments by screening;

conveying the glass fragments onwards past a magnetic separator;

feeding the metal fragments into a crusher to obtain crushed metal fragments;

introducing the crushed metal fragments with a current of air into a second separating tower from which they are transported onwards past the magnetic separator;

collecting the magnetic material fragments which have been separated off by the magnetic separator in a container;

feeding the glass fragments which have passed the magnetic separator into a glass crusher, where they undergo further reduction in size;

introducing the glass fragments of reduced size with a current of air into a third separating tower, from which they are discharged;

collecting the glass fragments discharged from the third separating tower in a waste glass container;

separating off fluorescent powder entrained in the currents of exhaust air from the separating towers by passing said currents of exhaust air first through a cyclone, and thereafter through a dust filter; and thereafter separating off any remaining mercury vapor in the exhaust air by passage through charcoal filters.

2. The method according to claim 1, wherein the larger material fragments which have been separated off from each tower's incoming current of air are discharged from the respective separating tower through a rotary valve which is arranged at the bottom end of the respective separating tower.

3. The method according to claim 1, wherein at least a greater part of airborne particulate material, including the fluorescent powder, which is introduced with the current of air into each separating tower is conveyed further upwards through the tower by the current of air and leaves an upper end of the tower together with the current of air issuing from the tower.

4. The method according to claim 1, wherein the glass fragments which have been separated off by screening downstream of the first separating tower, and the metal fragments which have been separated off in the second separating tower, are transported past the magnetic separator on a common conveyor path.

5. The method according to claim 1, wherein the glass fragments discharged from the third separating tower are after-treated for a few minutes in a rotating ventilating drum feeder, from which they are then transported to the waste glass container via a discharging conveyor.

6. System for mechanical separation of various materials from discarded fluorescent light tubes and similar low-pressure discharge lamps being broken up, the system comprising:

a fan-driven exhaust air system structured and arranged to transport and separate material fragments and particles, said exhaust air system being supplied with air from three separating towers which are each provided with an inlet, a coarse fraction outlet, and an air outlet functioning as a fine fraction outlet;

a mill for breaking up the discarded fluorescent light tubes, said mill having an outlet connected to the inlet of the first separating tower in which larger material fragments are separated off from the current of air which transports broken-up material from the mill to the first separating tower, while smaller material fragments and particles are carried off from the air outlet of the first separating tower, together with the current of air, to the exhaust air system;

a screen for dividing the material fragments discharged from the coarse fraction outlet of the first separating tower into glass fragments and metal fragments;

a metal crusher structured and arranged between the screen and the second separating tower for further breaking-up the metal fragments supplied from the screen; the inlet of the second separating tower being connected to an outlet of the metal crusher;

a magnetic separator arranged between the screen and the coarse fraction outlet of the second separating tower, and a glass crusher whose outlet is connected to the third separating tower;

a waste glass container arranged to receive glass fragments from the coarse fraction outlet of the third separating tower; and a cyclone with downstream exhaust air filters coupled between the air outlets of the separating towers and a suction fan of the exhaust air system.

7. The system according to claim 6, further comprising a belt conveyor receiving glass fragments from the screen and metal fragments from the coarse fraction outlet of the second separating tower, said belt conveyor extending past the magnetic separator so that magnetic material on the moving belt surface of the conveyor is removed by the magnetic separator, said belt conveyor having a downstream end arranged to deliver glass fragments to the glass crusher and metal fragments to a waste metal container.

8. The system according to claim 6, further comprising a conveyor path for transporting glass fragments from the coarse fraction outlet of the third separating tower to the waste glass container, said conveyor path comprising, in succession, a belt conveyor, a drum feeder which receives material from a discharge end of the belt conveyor, and a discharging conveyor which receives material from a discharge end of the drum feeder and which delivers the material to the waste glass container.

9. The system according to claim 6, wherein each separating tower has, as its coarse fraction outlet, a rotary valve which is arranged in the lowermost part of the tower and which is used for discharging the larger material fragments which have been separated off from incoming current of air in the tower.

10. The system according to claim 6, wherein the mill is a hammer mill which smashes the supplied fluorescent tubes into fairly large bits.

11. The system according to claim 6, wherein the entire system is accommodated in a closed housing in the form of a closed 20-foot container, which includes means for maintaining the specific pressure therein which is below the surrounding atmospheric pressure at the site of the housing.

* * * * *